US011152873B2

(12) United States Patent
Culpi

(10) Patent No.: US 11,152,873 B2
(45) Date of Patent: Oct. 19, 2021

(54) PIEZO-ELECTRIC MOTOR WITH PIEZO STACK AND SPRING STRAP

(71) Applicant: Physik Instrumente (PI) GmbH & Co. KG, Karlsruhe (DE)

(72) Inventor: William Culpi, Lake Forest, CA (US)

(73) Assignee: Physik Instrumente (PI) GmbH & Co. KG, Karlsruhe (DE)

(*) Notice: Subject to any disclaimer, the term of this patent is extended or adjusted under 35 U.S.C. 154(b) by 305 days.

(21) Appl. No.: 16/472,332

(22) PCT Filed: Apr. 24, 2017

(86) PCT No.: PCT/IB2017/000554
§ 371 (c)(1),
(2) Date: Jun. 21, 2019

(87) PCT Pub. No.: WO2018/134637
PCT Pub. Date: Jul. 26, 2018

(65) Prior Publication Data
US 2019/0379301 A1    Dec. 12, 2019

Related U.S. Application Data

(60) Provisional application No. 62/447,694, filed on Jan. 18, 2017.

(51) Int. Cl.
*H02N 2/02* (2006.01)
*H02N 2/00* (2006.01)

(52) U.S. Cl.
CPC ............ *H02N 2/025* (2013.01); *H02N 2/006* (2013.01)

(58) Field of Classification Search
CPC .................. H02N 2/025; H02N 2/006
See application file for complete search history.

(56) References Cited

U.S. PATENT DOCUMENTS 6,211,607 B1 * 4/2001 Kanbara ............... H02N 2/025
                                                        310/323.01
7,119,477 B1   10/2006 Ganor et al.
(Continued)

FOREIGN PATENT DOCUMENTS

| CN | 105827142 A | 8/2016 |
| CN | 207368906 U | 5/2018 |
| EP | 2590315 A1 | 5/2013 |

OTHER PUBLICATIONS

International Search Report and Written Opinion for Related Application No. PCT/IB2017/000554 dated Sep. 26, 2017 (15 pages).

(Continued)

*Primary Examiner* — Emily P Pham
(74) *Attorney, Agent, or Firm* — Michael Best & Friedrich LLP

(57) ABSTRACT

A piezo-electric motor 100 includes an actuation portion including an actuation surface 106 and a piezo stack 102 that is operable in response to the application of a voltage to move the actuation surface along an actuation axis 116 between a retracted position and an extended position. A spring strap 112 partially surrounds the actuation portion and is operable to bias the actuation surface toward the retracted position and a movable portion 108,110 is frictionally engaged with the actuation surface. The voltage is selected such that the movable portion sticks to the actuation surface as the actuation surface moves toward one of the retracted position and the extended position and slips on the actuation surface as the actuation surface moves toward the other of the retracted position and the extended position.

22 Claims, 5 Drawing Sheets

(56) References Cited

U.S. PATENT DOCUMENTS

2002/0084719 A1\* 7/2002 Okamoto ............... H02N 2/025
                                                          310/328
2008/0111446 A1   5/2008 Matsuki
2008/0191583 A1   8/2008 Bohn

OTHER PUBLICATIONS

First Office Action issued by the China National Intellectual Property Administration for Application No. 201780083997.3 dated Sep. 2, 2020 (15 pages including English translation).
International Search Report, PCT/IB2017/000554, dated Sep. 26, 2017.
Written Opinion, PCT/IB2017/000554, dated Sep. 26, 2017.

\* cited by examiner

PIEZO-ELECTRIC MOTOR WITH PIEZO STACK AND SPRING STRAP

CROSS-REFERENCE TO RELATED APPLICATIONS

This application is a national stage filing under 35 U.S.C. § 371 of International Patent Application No. PCT/IB2017/000554, filed Apr. 24, 2017, which claims priority to U.S. Provisional Patent Application No. 62/447,694, filed Jan. 18, 2017, the entire contents of each of which are fully incorporated herein by reference.

BACKGROUND

Motors are used to produce a desired movement or operation of a device. Piezo motors can be used to produce small movements and occupy a small space.

SUMMARY

In one construction, a piezo-electric motor includes an actuation portion including an actuation surface and a piezo stack that is operable in response to the application of a voltage to move the actuation surface along an actuation axis between a retracted position and an extended position. A spring strap partially surrounds the actuation portion and is operable to bias the actuation surface toward the retracted position and a movable portion is frictionally engaged with the actuation surface. The voltage is selected such that the movable portion sticks to the actuation surface as the actuation surface moves toward one of the retracted position and the extended position and slips on the actuation surface as the actuation surface moves toward the other of the retracted position and the extended position.

In another construction, a piezo-electric motor includes a piezo stack movable along an actuation axis in response to the application of a voltage and a strip including a pair of opposed actuation surfaces, the strip fixedly attached to the piezo stack such that the strip moves between a retracted position and an extended position in response to movement of the piezo stack. A spring strap extends around a substantial portion of a perimeter defined by the piezo stack and the strip and is operable to bias the strip toward the retracted position. Each of a pair of pads is engagable with one of the actuation surfaces, and a spring head is engageable with each of the pair of pads to bias each of the pair of pads into frictional engagement with the respective actuation surface such that each of the pair of pads sticks to the respective actuation surface as the actuation surface moves toward one of the retracted position and the extended position and slips on the actuation surface as the actuation surface moves toward the other of the retracted position and the extended position.

In yet another construction, a piezo-electric motor includes a piezo stack operable in response to the application of a voltage to move along an actuation axis, a strip support fixedly attached to the piezo stack, and a strip including a pair of actuation surfaces fixedly attached to the strip support, the actuation surfaces movable between a retracted position and an extended position in response to movement of the piezo stack. A spring strap at least partially surrounds the piezo stack, the strip support, and the strip and is operable to bias the strip toward the retracted position. The spring strap cooperates with the strip support to define a wall that at least partially surrounds the perimeter of each of the actuation surfaces and extends beyond each of the actuation surfaces in a direction normal to the actuation axis. Each of a pair of pads is engagable with one of the actuation surfaces, and a spring head is engageable with each of the pair of pads bias each of the pair of pads into frictional engagement with the respective actuation surface such that each of the pair of pads sticks to the respective actuation surface as the actuation surface moves toward one of the retracted position and the extended position and slips on the actuation surface as the actuation surface moves toward the other of the retracted position and the extended position.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
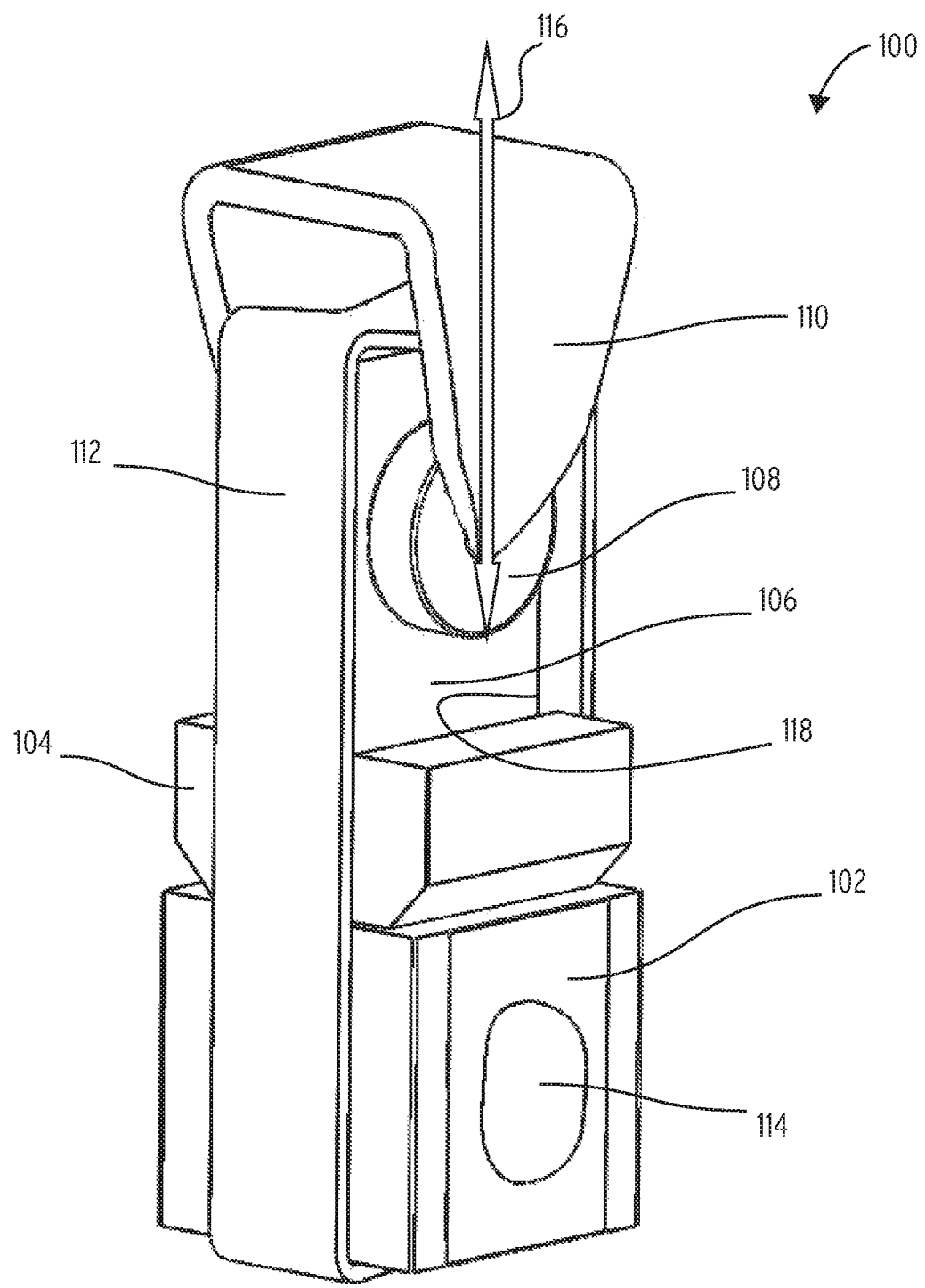
FIG. 1 is a perspective view of a piezo micro motor.
Figure 2:
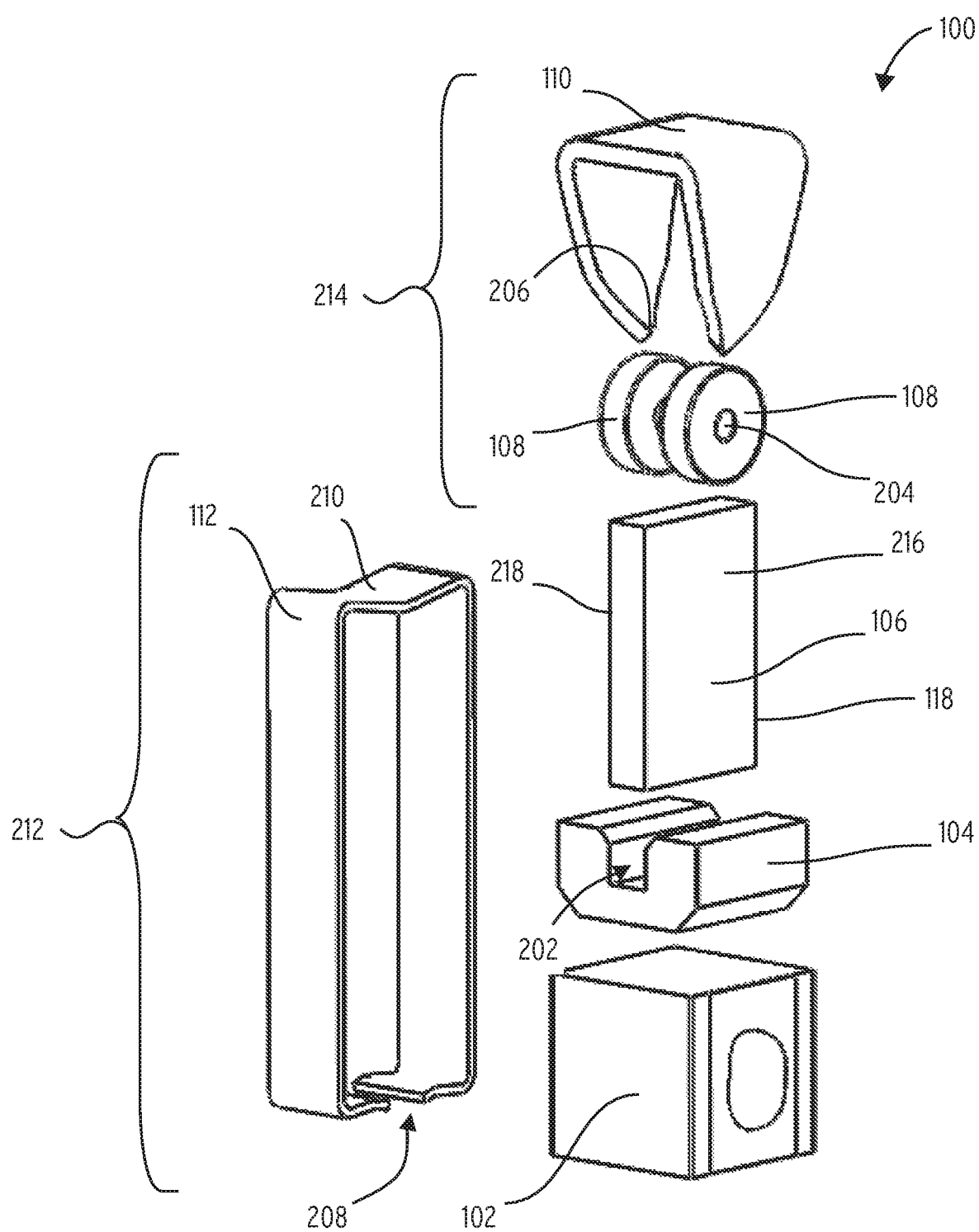
FIG. 2 is an exploded view of the motor of FIG. 1.

FIG. 1 illustrates a motor 100 in the form of a piezo electric micro-motor. The motor 100 is arranged to operate using the stick-slip principle of operation as will be described in greater detail below. As illustrated in FIG. 1 and FIG. 2 the motor 100 includes an actuation portion having a piezo stack 102, a strip support 104, a strip 106, and a spring strap 112. The motor 100 also includes movable portion having a first pad 108, a second pad 108, and a spring head 110. The motor 100 of FIG. 1 is arranged to move the spring head 110 linearly along an actuation axis 116 of the motor 100.

With continued reference to FIG. 1, the piezo stack 102 is arranged in a roughly cubical form (e.g., 2 mm×2 mm×2 mm) with other shapes and sizes being possible. The piezo stack 102 includes a solder pad 114 on two opposite sides with each arranged to receive an electrical lead that provides power in the form of a variable voltage signal to the piezo stack 102.

The strip support 104 is fixedly attached to the piezo stack 102 using an adhesive or other form of attachment. The strip support 104 includes a groove 202 sized and arranged to receive the strip 106. In preferred constructions, the strip 106 is fixedly attached to the strip support 104 using an adhesive or other attachment system. In preferred constructions, the strip support 104 is formed from a metallic substance with other constructions using other materials as may be required.

Figure 5:
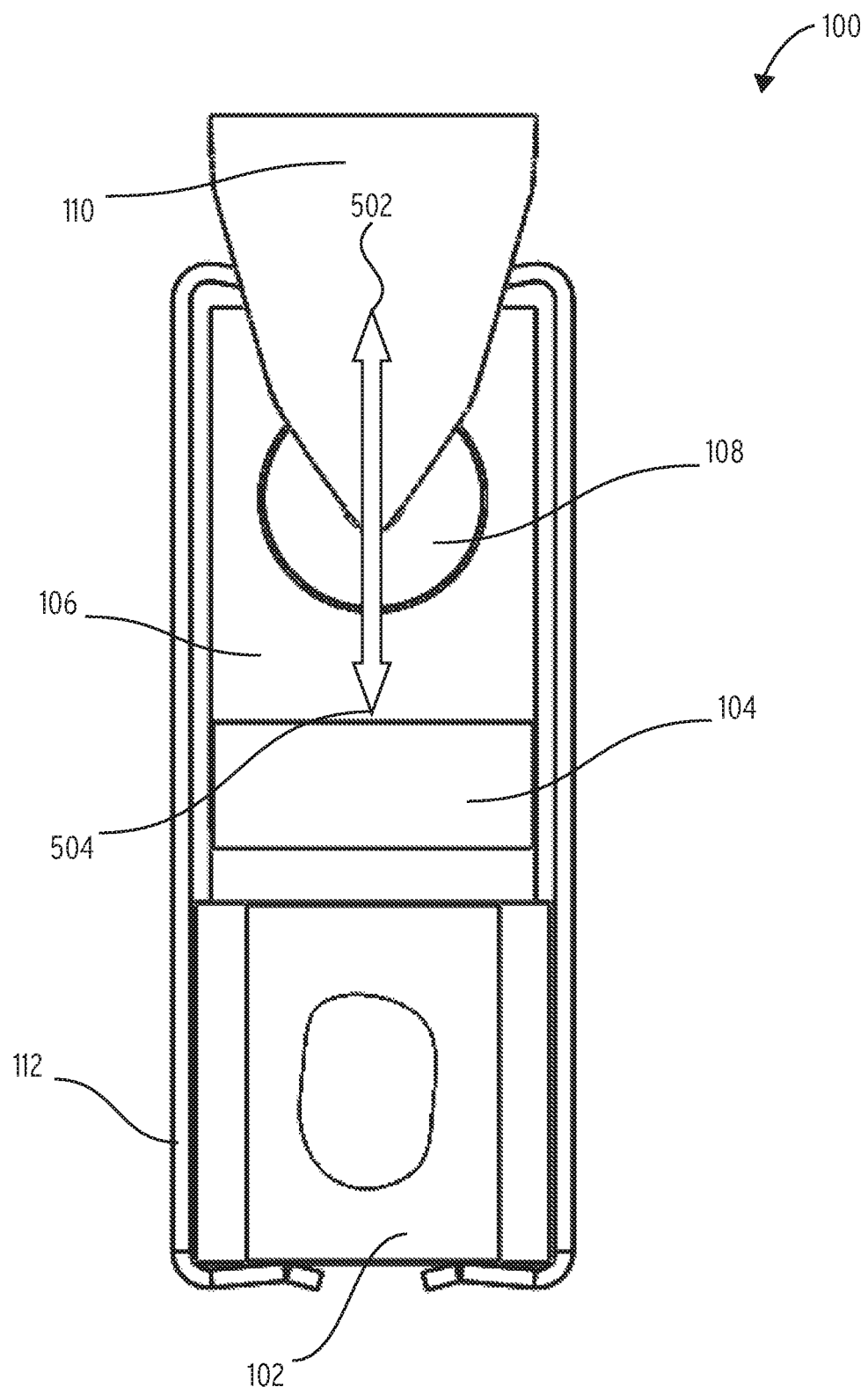
FIG. 5 is a front view of the motor of FIG. 1.

The strip 106 is an elongated rectangular or cuboid member preferably formed from a ceramic material. Of course, other materials such as steel, other metals, or non-metals could be used as the strip 106. As illustrated in FIG. 2, the strip 106 includes a first actuation surface 216 and a second actuation surface 218 opposite the first actuation surface 216. The edge that surrounds and defines the ends of the first actuation surface 216 and the second actuation surface 218 define a portion of a perimeter 118. With reference to FIG. 1 and FIG. 5, it can be seen that the spring strap 112 and the strip support 104 cooperate to define the complete perimeter 118. Thus, the spring strap 112 surrounds three edges of the strip 106 to define a portion of the perimeter 118 with the top of the strip support 104 completing the perimeter 118.

Each of the first pad 108 and the second pad 108 are preferably made from a ceramic material (e.g., sapphire) with other non-metallic or metallic materials being possible. The materials, as well as the surface finishes used for the strip 106, the first pad 108, and the second pad 108 are selected to provide the desired frictional relationship. Specifically, the materials, finishes, and sizes are selected to provide the desired coefficient of friction, and force required for movement, but also to provide the desired level of "stickiness" as will be discussed below.

With reference to FIG. 2, the first pad 108 and the second pad 108 are generally identical cylindrical components that each include an aperture 204 in the center of the pad 108. In some constructions, the aperture 204 is a simple indentation. In other constructions, the aperture 204 passes through the pad 108, with still other constructions having an aperture 204 that passes only partially into the pad 108.

The spring head 110 is a generally U-shaped member preferably formed from spring steel or another like material. A first point 206 is formed at one end of the spring head 110 with a second point 206 formed at the opposite end of the spring head 110 to define a pair of opposing points. Each point 206 is arranged to engage the aperture 204 of one of the first pad 108 and the second pad 108 to allow pivotal movement of the spring head 110 about an axis that extends between the points. The spring head 110 is arranged to use a spring force to press each pad 108 against the respective actuation surface 216, 218 of the strip 106 with a desired level of force (i.e., normal force) to produce the desired operation of the motor 100. In addition, and as illustrated in FIG. 3, the arrangement of the spring head 110 and its attachment to the first pad 108 and the second pad 108 allows for several degrees of freedom of movement of the spring head 110 with respect to the remainder of the motor 100.

The spring strap 112 is a generally rectangular member formed from a spring steel or other like material that includes an open bottom and a V-shaped top. As illustrated in FIG. 1 and FIG. 5, the spring strap 112 is sized to partially enclose the piezo stack 102, the strip support 104, and the strip 106. The V-shaped top 210 engages the strip 106 and provides a downward compressive force of the strip 106 and the strip support 104 against the piezo stack 102, much like a leaf spring. This preload enhances the operation of the motor 100 as will be discussed below.

Figure 3:
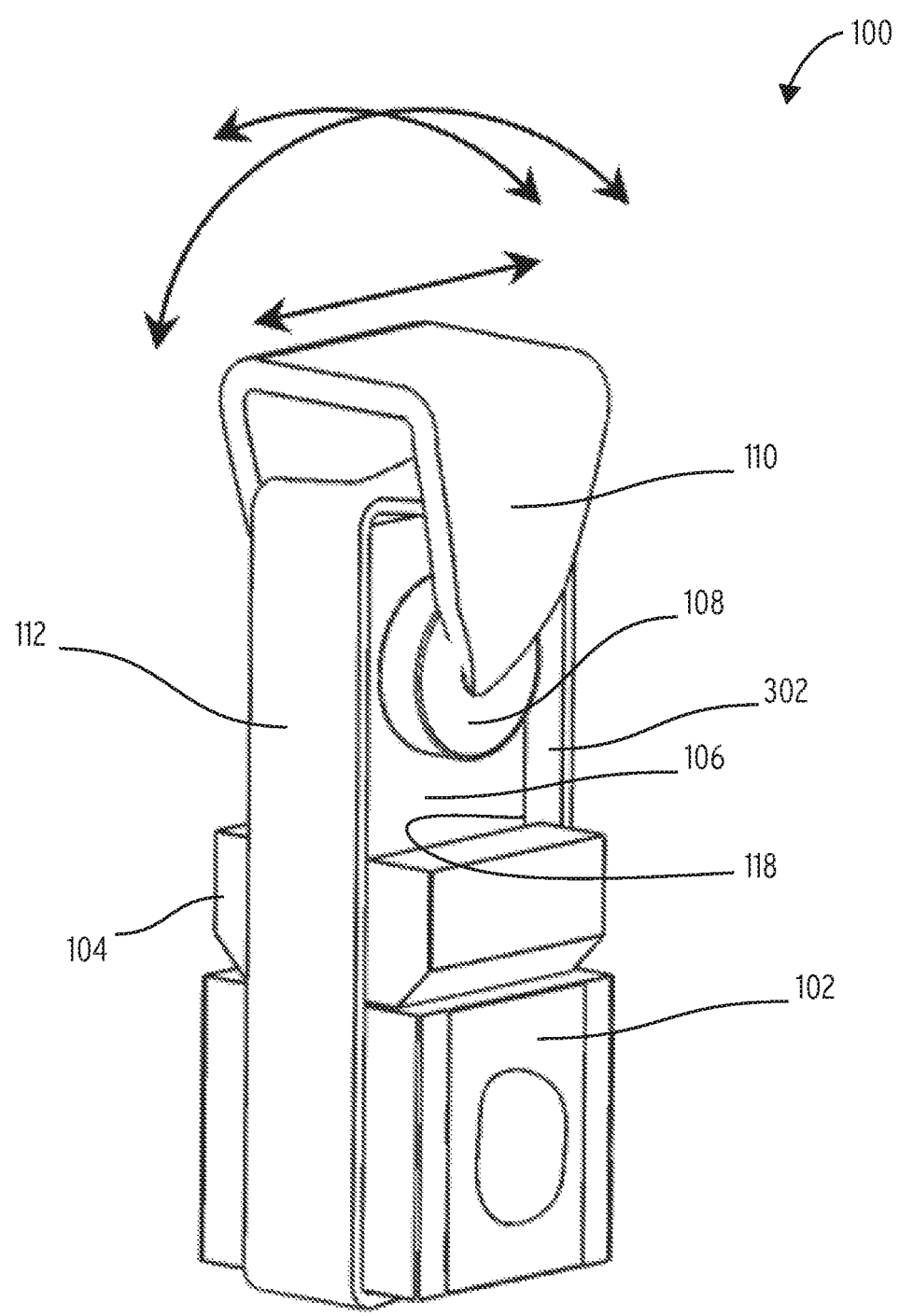
FIG. 3 is a perspective view of the motor of FIG. 1 illustrating the movement of a spring head.
Figure 4:
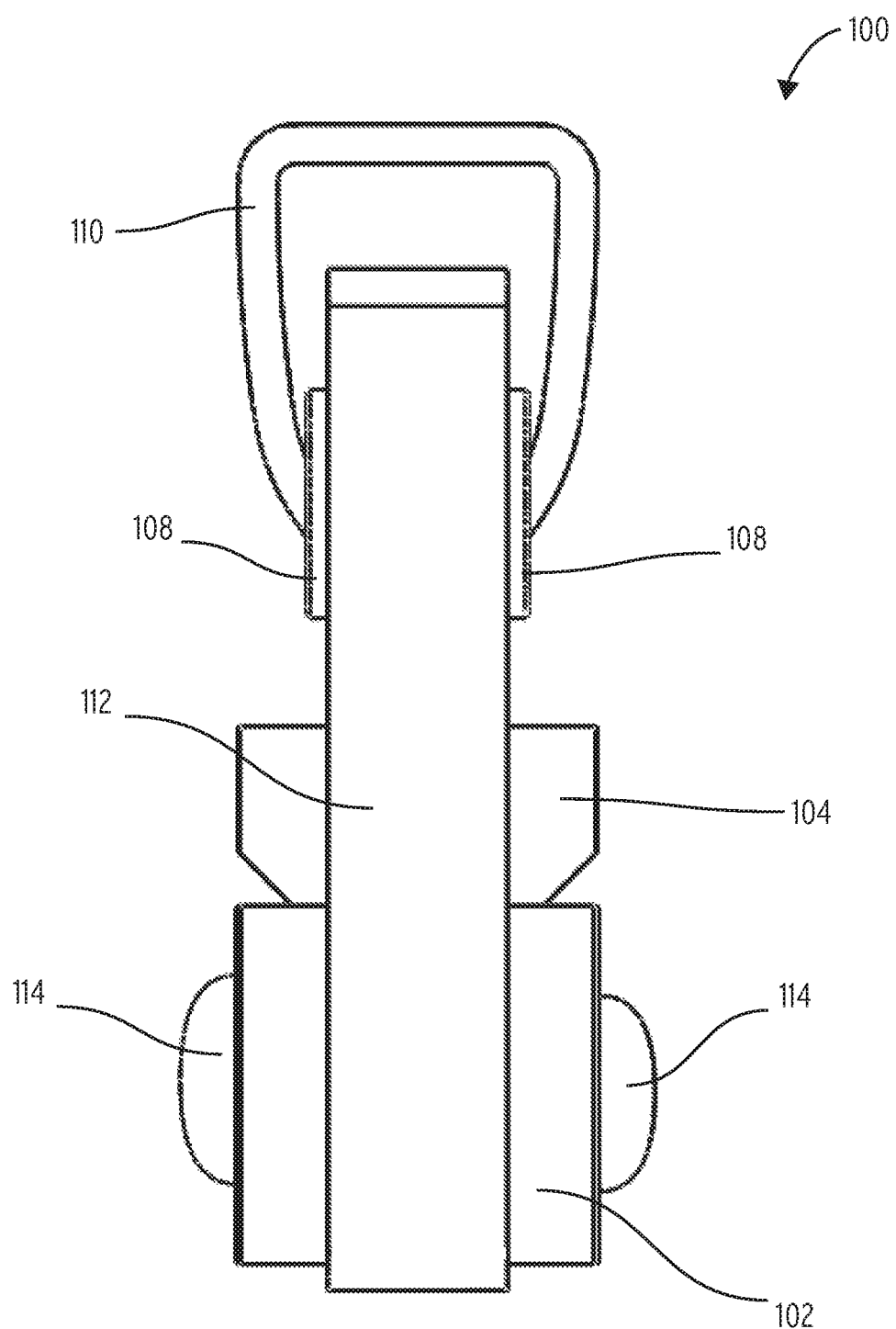
FIG. 4 is a side view of the motor of FIG. 1.

With reference to FIG. 3, the spring strap 112 is wider than the strip 106 such that it extends beyond the perimeter 118 to define a wall 302. The wall 302 cooperates with the strip support 104 to enclose the perimeter 118 and inhibit departure of the pad 108 from the actuation surfaces 216, 218.

In operation, a cyclic voltage is applied to the piezo stack 102 to produce the desired movement. The voltage produces an expansion of the piezo stack 102, with repeated expansions producing the desired movement of the spring head 110. Specifically, expansion of the piezo stack 102 produces a corresponding movement of the strip support 104 and the strip 106 which are each fixedly attached to the piezo stack 102. In order to amplify the small movement of the piezo stack 102 (typically a few microns) to a desired movement of the spring head 110 (portions of a millimeter to several millimeters), the motor 100 operates using the stick-slip principle. Specifically, the voltage is applied at a low enough rate that each pad 108 remains stuck to the strip 106 as the strip 106 moves in a first direction, thereby moving each pad 108. In other words, the sticking friction is not overcome. At the end of the travel, the voltage is removed quickly such that the spring force produced by the spring strap 112 and the retraction of the piezo stack 102 are fast enough to overcome the sticking friction and allow relative movement between each pad 108 and the strip support 104 in a second direction. This cycle is repeated until the desired motion is achieved.

For example and with reference to FIG. 5, in one operation it is desirable to move the spring head upward from a first or retracted position in which the pad 108 abuts or nearly abuts the strip support 104 to an extended position in which the pad 108 abuts or nearly abuts the V-shaped top 210 of the spring strap 112. In order to move upward, a voltage signal is applied that produces an expansion of the piezo stack 102 and a corresponding movement of the strip 106 toward the extended position 502 at a relatively slow rate. The slow rate is selected to assure that the sticking friction between the pads 108 and the strip 106 is not overcome and the pads 108 as well as the spring head 110 move upward toward the extended position 502. Once the piezo stack 102 reaches its full extended position, the voltage signal is reversed to allow (and cause) a retraction of piezo stack 102. The voltage signal is such that the return occurs at a much higher rate to assure that the sticking friction between the pads 108 and the strip 106 is overcome and the strip 106 retracts and slides under the pads 108 without moving the pads. While this motion was described with regard to movement toward the extended position 502, the voltage signals could be reversed to produce a similar movement toward the retracted position 504.

The spring strap 112 applies a pre-compression or preload to the strip 106 to aid in pushing the strip 106 back to its original position following the removal or reversal of the voltage. In addition, the spring strap 112 surrounds the strip 106 to inhibit unwanted lateral movement of each pad 108.

In preferred constructions, the motor 100 is less than 5 mm in overall length with other constructions including longer or shorter motors as may be desired. The motor 100 is capable of producing controlled motion, when driven by a suitable controller or microprocessor, of fractions of a millimeter to several millimeters as may be desired.

Various features and advantages of the invention are set forth in the following claims.

What is claimed is:

1. A piezo-electric motor comprising:
   an actuation portion including an actuation surface and a piezo stack that is operable in response to an application of a voltage to move the actuation surface along an actuation axis between a retracted position and an extended position;
a spring strap partially surrounding the actuation portion and operable to bias the actuation surface toward the retracted position; and
a movable portion frictionally engaged with the actuation surface, wherein the voltage is selected such that the movable portion sticks to the actuation surface as the actuation surface moves toward one of the retracted position and the extended position and slips on the actuation surface as the actuation surface moves toward the other of the retracted position and the extended position;
wherein the actuation portion comprises a strip fixedly attached to the piezo stack, wherein the strip is cuboid in shape and wherein the actuation surface includes two opposite surfaces of the strip.

2. The piezo-electric motor of claim 1, further comprising a first solder pad coupled to a first side of the piezo stack and a second solder pad coupled to a second, opposite side of the piezo stack, wherein the first solder pad and the second solder pad are each configured to be coupled to an electrical lead to provide power to the piezo stack.

3. The piezo-electric motor of claim 1, wherein the actuation portion further comprises a strip support that is directly and fixedly attached to the piezo stack and wherein the strip is fixedly and directly attached to the strip support.

4. The piezo-electric motor of claim 1, wherein the spring strap comprises a V-shaped portion that contacts the strip to bias the strip toward the retracted position.

5. The piezo-electric motor of claim 1, wherein the spring strap surrounds a portion of the actuation surface to at least partially define a wall that extends beyond the actuation surface in a direction normal to the actuation axis.

6. The piezo-electric motor of claim 1, wherein the spring strap is formed from spring steel.

7. The piezo-electric motor of claim 1, wherein the movable portion comprises a pair of pads and wherein each pad engages one of the two opposite surfaces of the strip.

8. The piezo-electric motor of claim 7, wherein the movable portion further comprises a spring head that engages each pad of the pair of pads and biases each pad into frictional engagement with the actuation surface.

9. The piezo-electric motor of claim 8, wherein each pad of the pair of pads is disk-shaped and includes one of an indentation and an aperture that receives the spring head.

10. A piezo-electric motor comprising:
a piezo stack movable along an actuation axis in response to an application of a voltage;
a strip including a pair of opposed actuation surfaces, the strip fixedly attached to the piezo stack such that the strip moves between a retracted position and an extended position in response to movement of the piezo stack;
a spring strap extending around a portion of the piezo stack and the strip and operable to bias the strip toward the retracted position;
a pair of pads, each pad engageable with one of the actuation surfaces; and
a spring head engageable with each pad of the pair of pads and operable to bias each pad of the pair of pads into frictional engagement with the respective actuation surface such that each pad of the pair of pads sticks to the respective actuation surface as the actuation surface moves toward one of the retracted position and the extended position and slips on the actuation surface as the actuation surface moves toward the other of the retracted position and the extended position.

11. The piezo-electric motor of claim 10, wherein the strip is cuboid in shape.

12. The piezo-electric motor of claim 10, wherein the spring strap comprises a V-shaped portion that contacts the strip to bias the strip toward the retracted position.

13. The piezo-electric motor of claim 10, wherein the spring strap is formed from spring steel.

14. The piezo-electric motor of claim 10, wherein the spring strap surrounds a portion of each of the actuation surfaces to define a wall that extends beyond each actuation surface in a direction normal to the actuation axis.

15. The piezo-electric motor of claim 10, wherein each pad of the pair of pads is disk-shaped and includes one of an indentation and an aperture that receives the spring head.

16. The piezo-electric motor of claim 15, wherein the spring head comprises a pair of opposing points, and wherein each point of the pair of points engages the one of an indentation and an aperture of one of the pads of the pair of pads.

17. The piezo-electric motor of claim 10, wherein the strip is formed from a ceramic material and the pad is formed from a ceramic material such as sapphire.

18. A piezo-electric motor comprising:
a piezo stack operable in response to an application of a voltage to move along an actuation axis;
a strip support fixedly attached to the piezo stack;
a strip including a pair of actuation surfaces fixedly attached to the strip support, the actuation surfaces movable between a retracted position and an extended position in response to movement of the piezo stack;
a spring strap at least partially surrounding the piezo stack, the strip support, and the strip and operable to bias the strip toward the retracted position, the spring strap cooperating with the strip support to define a wall that surrounds the perimeter of each of the actuation surfaces and extends beyond each of the actuation surfaces in a direction normal to the actuation axis;
a pair of pads, each pad engageable with one of the actuation surfaces; and
a spring head engageable with each pad of the pair of pads and operable to bias each pad of the pair of pads into frictional engagement with the respective actuation surface such that each pad of the pair of pads sticks to the respective actuation surface as the actuation surface moves toward one of the retracted position and the extended position and slips on the actuation surface as the actuation surface moves toward the other of the retracted position and the extended position.

19. The piezo-electric motor of claim 18, wherein the spring strap comprises a V-shaped portion that contacts the strip to bias the strip toward the retracted position.

20. The piezo-electric motor of claim 18, wherein each pad of the pair of pads is disk-shaped and includes one of an indentation and an aperture that receives the spring head.

21. The piezo-electric motor of claim 20, wherein the spring head comprises a pair of opposing points, and wherein each point of the pair of points engages the one of an indentation and an aperture of one of the pads of the pair of pads.

22. A piezo-electric motor comprising:
an actuation portion including an actuation surface and a piezo stack that is operable in response to an application of a voltage to move the actuation surface along an actuation axis between a retracted position and an extended position;

a spring strap partially surrounding the actuation portion and operable to bias the actuation surface toward the retracted position;

a movable portion frictionally engaged with the actuation surface, wherein the voltage is selected such that the movable portion sticks to the actuation surface as the actuation surface moves toward one of the retracted position and the extended position and slips on the actuation surface as the actuation surface moves toward the other of the retracted position and the extended position; and a first solder pad coupled to a first side of the piezo stack and a second solder pad coupled to a second, opposite side of the piezo stack, wherein the first solder pad and the second solder pad are each configured to be coupled to an electrical lead to provide power to the piezo stack.

* * * * *